United States Patent
Murphy

(10) Patent No.: US 9,450,688 B1
(45) Date of Patent: Sep. 20, 2016

(54) AUTONOMOUS SPECTRAL HARVESTING SYSTEM

(71) Applicant: Ryan M. Murphy, Marion, IA (US)

(72) Inventor: Ryan M. Murphy, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/720,198

(22) Filed: May 22, 2015

(51) Int. Cl.
| | |
|---|---|
| H04B 17/00 | (2015.01) |
| H04B 17/27 | (2015.01) |
| H04B 17/345 | (2015.01) |
| H04B 17/336 | (2015.01) |
| H04B 1/08 | (2006.01) |

(52) U.S. Cl.
CPC .............. H04B 17/27 (2015.01); H04B 1/082 (2013.01); H04B 17/336 (2015.01); H04B 17/345 (2015.01)

(58) Field of Classification Search
CPC ................................ G01R 23/00; G01R 23/16
See application file for complete search history.

(56) References Cited

U.S. PATENT DOCUMENTS 8,131,239 B1 * 3/2012 Walker .................... G01S 7/021 340/10.42
2010/0246636 A1 * 9/2010 Haartsen ................ H04B 1/719 375/130
2010/0274511 A1 * 10/2010 Hirobayashi ......... G06F 17/141 702/76
2012/0072986 A1 * 3/2012 Livsics .................. H04B 1/719 726/22

OTHER PUBLICATIONS

Cohen, Noise Spectrum Estimation in Adverse Environments: Improved Minima Controlled Recursive Averaging, IEEE Transactions on Speech and Audio Processing, vol. 11, No. 5, Sep. 2003, 10 pages.
Smith, Special Imaging Techniques, The Scientist and Engineers Guide to Digital Signal Processing, 1997, Chapter 25, 28 pages.

* cited by examiner

*Primary Examiner* — Nguyen Vo
(74) *Attorney, Agent, or Firm* — Donna P. Suchy; Daniel M. Barbieri

(57) ABSTRACT

A spectral harvesting system has one or more sensor modules and a processor. The sensor modules autonomously scan RF signals over a range of frequencies in a region of interest. The processor receives observed RF signals from the sensor modules, and performs signal analysis on the observed RF signals received. The signal analysis includes converting the observed RF signals into a frequency signal in a frequency domain, temporally averaging the frequency signal to provide a temporally averaged frequency signal, performing a coarse estimate of the spectral noise floor of the observed RF signals based on the temporally averaged frequency signal using an opening technique that performs an erosion process followed by a dilation process on the temporally averaged frequency signal, and determining an a-posteriori signal presence probability of a signal being present from an RF emitter in the region of interest based on the coarse estimate.

20 Claims, 3 Drawing Sheets

AUTONOMOUS SPECTRAL HARVESTING SYSTEM

BACKGROUND

The present invention relates generally to the field of spectral harvesting systems for RF (radio frequency) emissions from RF emitters.

Spectral harvesting systems which harvest RF spectral emissions are known. In spectral harvesting, RF signals in a target region are detected, and target RF emitters are determined and identified. The type of target may then be determined based on the type of RF signal (modulation, baud rate, frequency, etc.), emitted by the RF emitter.

Detection of target RF transmitters depends on the RF band spectral noise. Conventionally, RF signal detection systems rely on an RF communication signal to be absent in order to estimate the RF band spectral noise.

In the area of audio signal enhancement, it is known to detect and enhance an audio signal in the presence of non-stationary noise where the level of audio signals varies in time. Audio signal processing techniques such as minima controlled recursive averaging (MCRA) provide robust noise estimates in highly non-stationary audio environments such as street, train, or cocktail noise environments.

Audio signal processing techniques such as MCRA, however, are not appropriate for RF signal processing since MCRA was formulated based on the knowledge of the cadence of human speech.

SUMMARY OF THE INVENTION

According to one embodiment of the invention there is described an autonomous radio frequency (RF) spectral harvesting system. The system comprises: one or more sensor modules configured to autonomously scan RF signals over a range of frequencies in a region of interest; and a processor configured to: receive observed RF signals from the one or more sensor modules; and perform signal analysis on the observed RF signals received, the signal analysis comprising: converting the observed RF signals into a frequency signal in a frequency domain; temporally averaging the frequency signal to provide a temporally averaged frequency signal; performing a coarse estimate of the spectral noise floor of the observed RF signals based on the temporally averaged frequency signal using an opening technique that performs an erosion process followed by a dilation process on the temporally averaged frequency signal; and determining an a-posteriori signal presence probability of a signal being present from an RF emitter in the region of interest based on the coarse estimate.

According to one aspect of the embodiment, the processor is further configured to: perform a fine noise estimate of the spectral noise floor after the coarse estimate by applying a weighted average of the coarse noise estimate and the frequency signal, wherein the a-posteriori signal presence probability is based on the fine noise estimate.

According to another aspect of the embodiment, the processor is further configured to: determine an a-posteriori signal to noise ratio (SNR) and an a-priori SNR based on the fine noise estimate, wherein the a-posteriori signal presence probability is based on the a-posteriori SNR and the a-priori SNR.

According to another aspect of the embodiment, the a-priori SNR is determined further based on a spectral gain factor from a Weiner filter.

According to another aspect of the embodiment, the processor is further configured to: determine an a-priori signal absence probability based on the coarse estimate; and temporally average the a-priori signal absence probability, wherein the a-posteriori signal presence probability is based on the temporally averaged a-priori signal absence probability.

According to another aspect of the embodiment, the observed RF signals are converted into the frequency signal in a frequency domain based on a Weighted Overlap Add process.

According to another aspect of the embodiment, the one or more sensor modules are mounted on aircraft.

According to another aspect of the embodiment, the aircraft are unmanned.

According to another aspect of the embodiment, the processor is further configured to: identify a RF emitter as a target based on the a-posteriori signal presence probability being above a confidence level.

According to another aspect of the embodiment, the processor is further configured to: identify the type of an identified target based on the parameters of its frequency signal.

According to another aspect of the embodiment, the parameters include at least one of a baud rate, Doppler frequency, or modulation family of the frequency signal of the identified target.

According to another aspect of the embodiment, the processor is further configured to determine the target location of the identified target.

According to another embodiment of the invention there is described an autonomous radio frequency (RF) spectral harvesting method. The method comprises: autonomously scanning RF signals, via one or more sensor modules, over a range of frequencies in a region of interest; receiving observed RF signals from the one or more sensor modules; and performing signal analysis on the observed RF signals received, the performing signal analysis comprising: converting the observed RF signals into a frequency signal in a frequency domain; temporally averaging the frequency signal to provide a temporally averaged frequency signal; performing a coarse estimate of the spectral noise floor of the observed RF signals based on the temporally averaged frequency signal using an opening technique that performs an erosion process followed by a dilation process on the temporally averaged frequency signal; and determining an a-posteriori signal presence probability of a signal being present from an RF emitter in the region of interest based on the coarse estimate.

According to one aspect of the embodiment, the performing signal analysis further comprises: performing a fine noise estimate of the spectral noise floor after the coarse estimate by applying a weighted average of the coarse noise estimate and the frequency signal, wherein the a-posteriori signal presence probability is based on the fine noise estimate.

According to another aspect of the embodiment, the performing signal analysis further comprises: determining an a-posteriori signal to noise ratio (SNR) and an a-priori SNR based on the fine noise estimate, wherein the a-posteriori signal presence probability is based on the a-posteriori SNR and the a-priori SNR.

According to another aspect of the embodiment, the a-priori SNR is determined further based on a spectral gain factor from a Weiner filter.

According to another aspect of the embodiment, the performing signal analysis further comprises determining an a-priori signal absence probability based on the coarse estimate; and temporally averaging the a-priori signal absence probability, wherein the a-posteriori signal presence probability is based on the temporally averaged a-priori signal absence probability.

According to another aspect of the embodiment, the observed RF signals are converted into the frequency signal in a frequency domain based on a Weighted Overlap Add process.

According to another aspect of the embodiment, the method further comprises: identifying a RF emitter as a target based on the a-posteriori signal presence probability being above a confidence level.

According to another aspect of the embodiment, the method further comprises: identifying the type of an identified target based on the parameters of its frequency signal.

DETAILED DESCRIPTION

The present inventor has realized that a modified version of minima controlled recursive averaging (MCRA) may be applied for estimating the spectral noise floor for RF signals. In particular, the spectral noise floor for RF signals is determined based on signal processing including open controlled recursive averaging (OCRA), which uses open processing, similar to that used in image processing, for a coarse noise estimate, in addition to controlled recursive averaging. OCRA allows for a spectral noise floor determination which is appropriate to RF signals. The OCRA processing further may include a fine noise estimate for estimating the spectral noise floor by applying a weighted average of the coarse noise estimate bias and the instantaneous magnitude of the frequency signal.

The OCRA processing provides an improved computation of the spectral noise floor appropriate for RF signal processing in a non-stationary RF signal environment whether or not there is any actual RF signal emitter presently emitting. Thus, a spectral harvesting system employing OCRA processing for RF signals has an improved performance.

Figure 1:
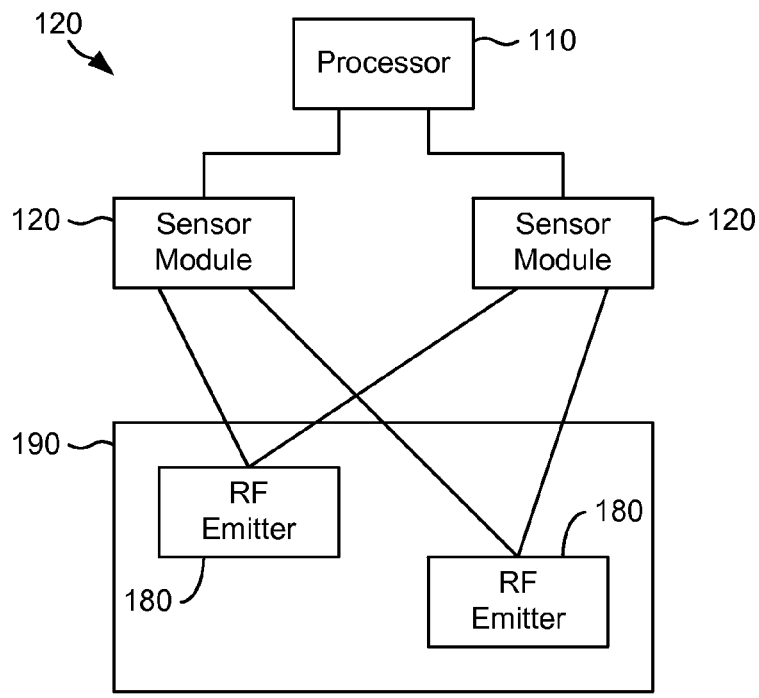
FIG. 1 is a schematic of a system for RF spectral harvesting according to an embodiment of the invention.

FIG. 1 illustrates a system 100 for RF spectral harvesting according to an embodiment of the invention. The system 100 detects RF signals from a region of interest 190 having RF emitters 180, such as radios, cell phones, or vehicles having one of more RF signal transmitters, for example.

The system 100 includes a number of sensor modules 120 configured to detect RF signals, and in particular to autonomously scan RF signals over a range of frequencies. The sensor modules 120 may be mounted on an aircraft, for example, such as an unmanned drone, or a manned aircraft. One or more modules 120 may be mounted on a single aircraft.

The system further includes a processor 110 to process an RF signal spectrum communicated from the sensor modules 120. The processor 110 may be a specialized processor configured to perform specific signal processing procedures on the RF signal spectrum received from the sensor modules 120. The processor 110 may include a memory to store data corresponding to the signal processing performed by the processor 110. The processor 110 may be programmed or otherwise structured to perform the specific signal processing procedures.

The processor 110 may be mounted on an aircraft, or may be on land. The processor 110 may be mounted on a same platform as one of the sensor modules, or on a different platform. The processor 110 may be localized as a single processor, or may comprise multiple sub-processors configured to perform a subset of the signal processing performed by the processor overall. The sub-processors may be located in a distributed or localized manner.

Figure 2:
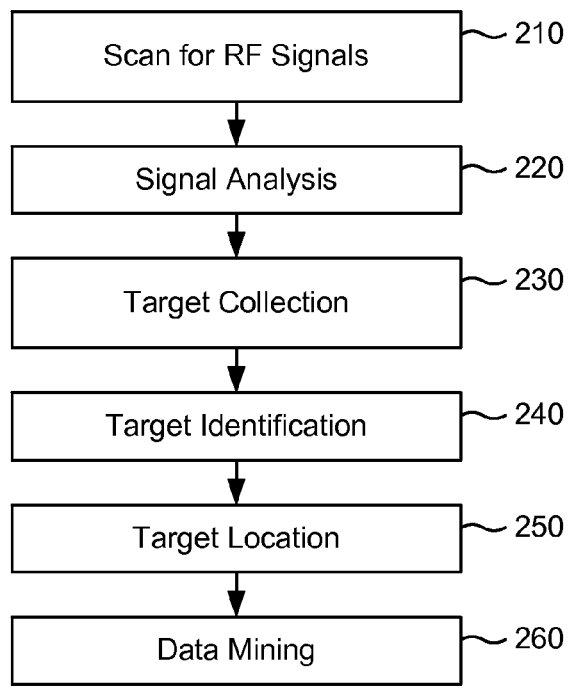
FIG. 2 is a flow chart illustrating a process of RF spectral harvesting according to an embodiment of the invention.

FIG. 2 is a flow chart illustrating a process of RF spectral harvesting from a region of interest (region of interest 190 in FIG. 1) which may possibly include a number of RF emitters (RF emitters 180 in FIG. 1). The process may be performed by a processor such as the processor 110 in FIG. 1.

In step 210, an RF signal is acquired by detecting RF signals over a range of scanned RF frequencies from a region of interest. The RF signals are autonomously scanned over a range of frequencies. The RF signals may be continuously detected over a length of time.

In step 220, signal analysis is performed on the detected RF signals. The detected RF signal are transformed to the frequency domain signals, which are indexed by frequency bin, and frame. The frequency bins corresponding to respectively different smaller frequency ranges within the scanned frequency range, while the frames each corresponds to a particular scanning sweep at different times. In the signal analysis step 220, the spectral noise floor is determined using an OCRA procedure. A purpose of the signal analysis step is to autonomously scan a configurable range of frequencies and dynamically estimate the probability of a signal presence from an RF emitter in the region of interest. The signal analysis step 220 includes autonomous estimation of the spectral noise floor using an OCRA procedure. Once the spectral noise floor is determined, further signal processing techniques are used to determine parameters such as signal presence, emitter signal to noise ratio (SNR), and average emitter power, which are stored and time stamped along with the RF signal frequency spectrum.

In step 230, target collection is performed using the data from the signal analysis step 220. Specifically, hypothesis testing on a collection of the frequency bins stored in the record is performed. The probability of an individual bin or collection of bins is then compared to a configurable confidence level. If the probability of the individual bin or collection of bins passes the configurable confidence level, then the RF emitter providing the signal is identified as a target. The RF signal bandwidth, center frequency, and angle of arrival of the signal from the RF emitter are estimated and stored for all target RF emitters.

In step 240, target identification is performed using data from steps 230 and 220. Parameters such as the baud rate, Doppler frequency, and modulation family are estimated for the targets. The individual targets are re-acquired and their baud rate and Doppler frequency are estimated, such as by using cyclic spectral analysis, for example. The RF signals from the targets are then frequency corrected and passed on for feature extraction and formulation of metrics corresponding to the individual targets based on parameters such as instantaneous phase, frequency and amplitude. An extracted feature set for each target is fused with cyclic metrics and passed onto an artificial neural network (ANN), for example, which determines a modulation classification of the RF signal from each target. The parameters, including the modulation classification, are then stored for all targets.

In step 250, target location is performed. In this case the location of a target RF emitter is determined based on the RF signal from the target, as is known.

In step 260, data mining is performed for each target based on the stored information from steps 220, 230, 240 and 250. The data mining extracts features such as the standard deviation of the phase and amplitude of the RF signal from a target, the baud rate and modulation rate and any changes in these rates. The data mining provides additional identification of the target RF emitter based on comparison to the parameters of known emitters, for example.

Figure 3:
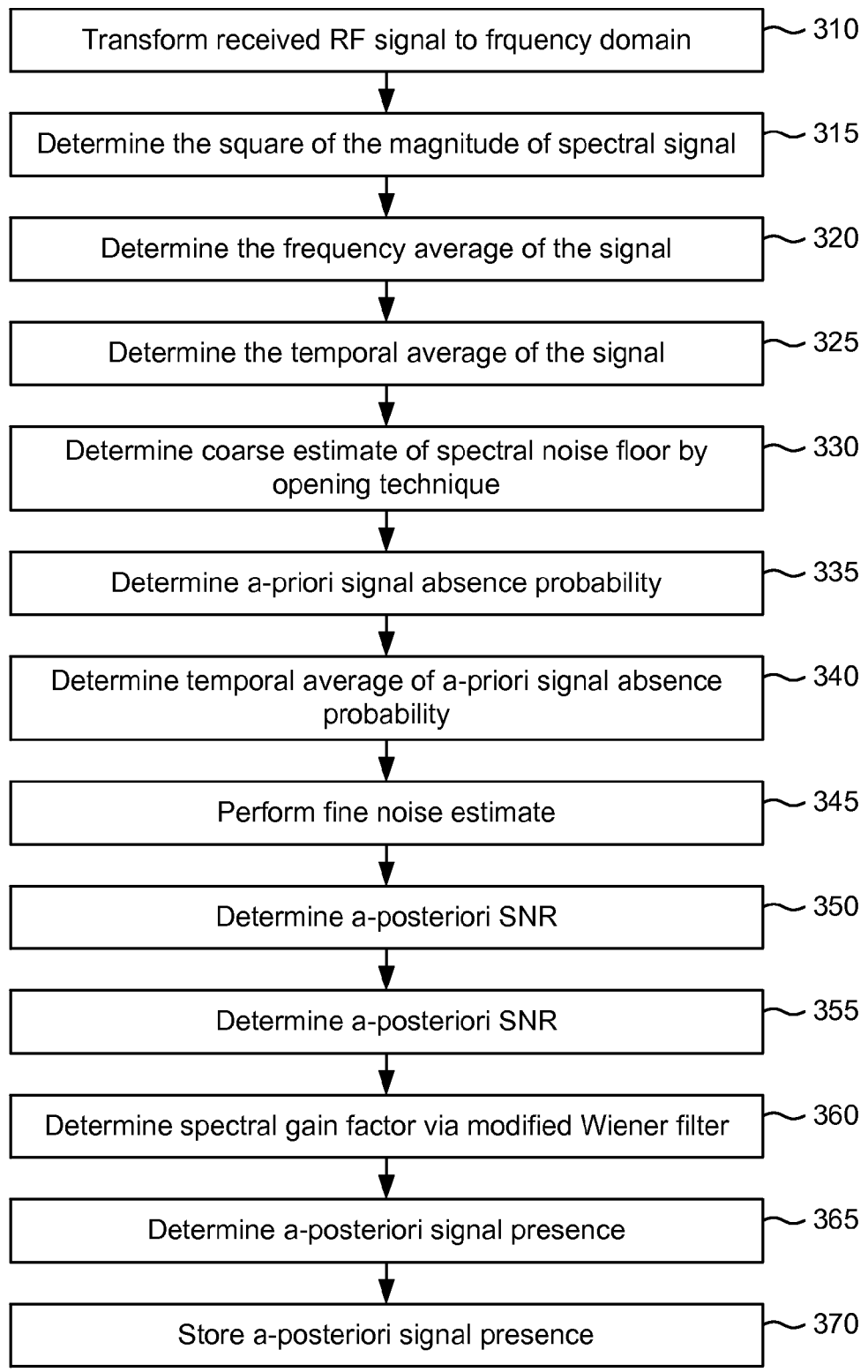
FIG. 3 is a flow chart illustrating in detail the signal analysis process step of the process of FIG. 2.
Figure 4:
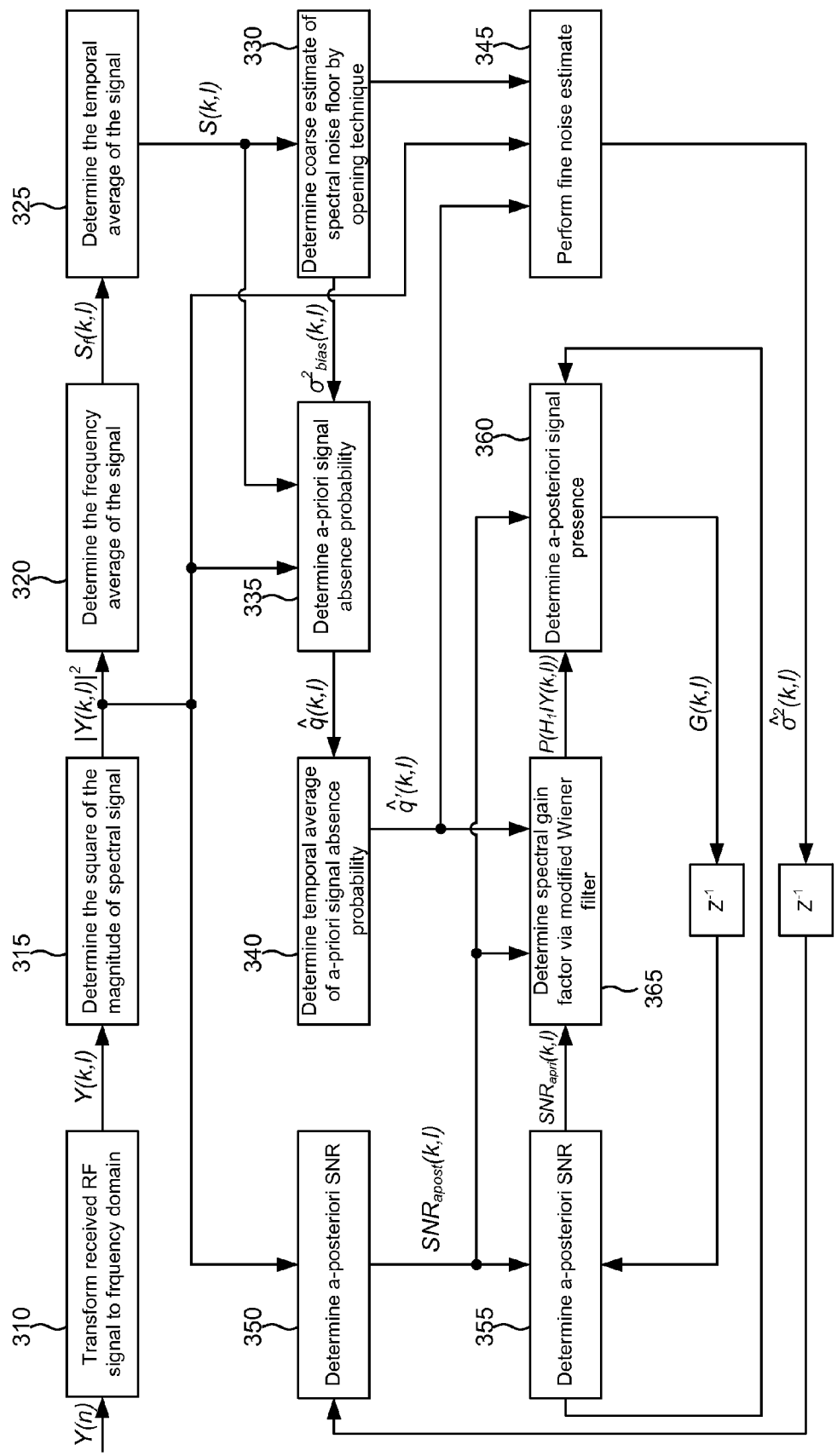
FIG. 4 is a diagram illustrating the parameter exchange between the steps in the signal analysis process of FIG. 3.

FIGS. 3 and 4 illustrate in more detail the signal analysis process of step 220 in FIG. 2. The signal analysis process includes an opening controlled recursive averaging (OCRA) procedure, as discussed further below. FIG. 3 is a flow chart, while FIG. 4 is a diagram illustrating the parameter exchange between the steps in the signal analysis process of FIG. 3. In step 310 an observed RF signal y(n) is received and is transformed to the frequency domain signal Y(k,l), where k is the index of the frequency bin, and l is the frame index. This transformation may be performed by, for example, a Weighted Overlap Add (WOLA) process. The WOLA process mitigates spectral bin smearing allowing for discrimination of two signals close in frequency.

In step 315 the square of the magnitude of the frequency signal Y(k,l) is determined providing $|Y(k,l)|^2$.

In steps 320 and 325, respectively, the frequency signal $|Y(k,l)|^2$ is frequency averaged, and temporally averaged, respectively. The frequency averaged signal $S_f(k,l)$ is provided by a smoothing operation such as by equation:

$$S_f(k,l) = \sum_{i=-w}^{w} b(i)|Y(k-i,l)|^2,$$

where b(i) is a normalized window function of length 2w+1. The frequency averaged signal $S_f(k,l)$ is then temporally averaged such as by performing a recursive averaging operation according to equation:

$$S(k,l) = \alpha_s * S(k,l-1) + (1-\alpha_s) * S_f(k,l),$$

where $\alpha_s$ is a smoothing parameter, to provide temporally averaged frequency signal S(k,l).

In step 330 a coarse estimate of the spectral noise floor is performed. The coarse estimate is performed using an "opening" technique, such as is performed in image processing. In the opening technique first an erosion process is performed, where each signal bin that is touching a noise bin is changed into a noise bin, followed by a dilation process where each noise bin that is touching a signal bin is changed into a signal bin. In this way a coarse estimate $\sigma^2_{bias}(k,l)$ of the spectral noise floor is determined by the following equations:

$$Er(k',l) = \min\left\{S(k',l) \mid k - \text{floor}\left(\frac{K}{2}\right) - 1 < k' \le k + \text{floor}\left(\frac{K}{2}\right)\right\}$$

$$Di(k'',l) = \max\left\{Er(k',l) \mid k' - \text{floor}\left(\frac{K}{2}\right) - 1 < k'' \le k' + \text{floor}\left(\frac{K}{2}\right)\right\}$$

where Er and Di are the erosion and dilation of S(k,l) over a kernel size of K. Finally, after substituting k for k'', the biased coarse noise estimate is given by $$\rho^2\text{bias}(k,l) = \max(Di(k,l), N\text{min}).$$

In step 335, the a-priori signal absence $\hat{p}(k,l)$ is determined based on the coarse estimate $\sigma^2_{bias}(k,l)$ of the spectral noise floor. The biased SNR's $\gamma_{open}(k,l)$ and $\zeta_{open}(k,l)$ are calculated using $\sigma^2_{bias}(k,l)$ by the equations:

$$\gamma_{open}(k,l) = |Y(k,l)|^2/f(\sigma^2_{bias}(k,l)), \text{ and}$$

$$\zeta_{open}(k,l) = S(k,l)/f(\sigma^2_{bias}(k,l)),$$

where $f(\sigma^2_{bias}(k,l))$ is a function of $\sigma^2_{bias}(k,l)$.

The a-priori signal absence $\hat{p}(k,l)$ for the probability that there is an emitter signal absent is given by:

$\hat{p}(k,l)$ is 1 if $\gamma_{open}(k,l) \le 1$ and $\zeta_{open}(k,l) < \zeta_0$, $\hat{p}(k,l)$ is $(\gamma_1 - \gamma_{open}(k,l))/(\gamma_1 - 1)$ if $1 < \gamma_{open}(k,l) < \gamma_1$ and $\xi(k,l) < \zeta_0$, and otherwise $\hat{p}(k,l)$ is 0, where $\gamma_1$ and $\zeta_0$ are threshold values of $\gamma_{open}$ and $\gamma_{open}$, respectively, set to satisfy a certain significance level.

In step 340 the a-priori signal absence $\hat{p}(k,l)$ is temporally averaged to provide the temporally averaged a-priori signal absence $\hat{p}'(k,l)$.

In step 345 a fine noise estimate is performed to determine the noise floor n(k,l). The noise floor n(k,l) in the fine noise estimate is provided by the equation:

$$n(k,l) = W * \sigma^2_{Bias}(k,l) + (1-W) * |Y(k,l)|^2,$$

where the weight factor $W = \beta * (1 - \hat{p}(k,l))$, and $\beta$ is a variable controlling the weight.

The equation for the noise floor n(k,l) weights the instantaneous estimate of the floor noise between the biased noise $\beta^2_{bias}(k,l)$ from the coarse noise estimate and the instantaneous magnitude of the frequency signal $|Y(k,l)|^2$. If a signal is deemed absent, then the instantaneous magnitude of the frequency signal $|Y(k,l)|^2$ is chosen. If a signal is deemed present, then the biased noise $\sigma^2_{bias}(k,l)$ is chosen. The variable 13 controls the weight or "confidence" in the probability of the signal absence $\hat{p}(k,l)$. When $\beta$ is high, there is less confidence that $\hat{p}(k,l)$ is accurate and there could be a signal present when thought absent, and in this case, the biased noise $\sigma^2_{bias}(k,l)$ is more strongly weighted.

The fine noise estimate $\hat{\sigma}^2(k,l)$ can then be determined based on recursive averaging using the equation:

$$\hat{\sigma}^2(k,l) = \alpha_d * \hat{\sigma}^2(k,l-1) + [1-\alpha_d] * |Y(k,l)|^2,$$

where $\alpha_d$ is a smoothing parameter.

In steps 350 and 355, respectively, the a-posteriori SNR $\gamma(k,l)$ and a-priori SNR $\xi(k,l)$ are calculated using fine noise estimate $\hat{\sigma}^2(k,l)$. The a-posteriori SNR $\gamma(k,l)$ is calculated using the equation:

$$\gamma(k,l) = |Y(k,l)|^2/\lambda_d(k,l),$$

where $\lambda_d(k,l)$ is a noise signal dependent on the noise estimate $\hat{\sigma}^2(k,l)$.

The a-priori SNR $\xi(k,l)$ is calculated using the recursive equation:

$$\lambda(k,l) = \alpha G^2(k,l-1) * \gamma(k,l-1) + (1-\alpha) * \max\{\gamma(k,l) - 1, 0\}.$$

where $\alpha$ is a weighting factor controlling the tradeoff between noise reduction and signal distortion, and the spectral gain factor G(k,l) is provided through the use of a modified Wiener filter in step 360.

In step 365, the a-posteriori probability of signal presence, $P(H_1|\gamma(k,l))$ is determined based on the a-posteriori SNR $\gamma(k,l)$ and a-priori SNR $\xi(k,l)$ from steps 350 and 355, which are based on the fine noise estimate $\hat{\sigma}^2(k,l)$. Further the spectral gain factor G(k,l) is scaled by the a-posteriori probability of signal presence, $P(H_1|\gamma(k,l))$.

In step 370, the a-posteriori probability of signal presence, $P(H_1|\gamma(k,l))$ is stored, and is the primary signal used in the detection of spectral emitters and spectral white space. The emitter SNR, and average emitter power may also be stored.

The embodiments of the invention have been described in detail with particular reference to preferred embodiments thereof, but it will be understood by those skilled in the art that variations and modifications can be effected within the spirit and scope of the invention.

What is claimed is:

1. An autonomous radio frequency (RF) spectral harvesting system comprising:
   one or more sensor modules configured to autonomously scan RF signals over a range of frequencies in a region of interest; and
   a processor configured to:
      receive observed RF signals from the one or more sensor modules; and
      perform signal analysis on the observed RF signals received,
   the signal analysis comprising:
   converting the observed RF signals into a frequency signal in a frequency domain;
   temporally averaging the frequency signal to provide a temporally averaged frequency signal;
   performing a coarse estimate of a spectral noise floor of the observed RF signals based on the temporally averaged frequency signal using an opening technique that performs an erosion process followed by a dilation process on the temporally averaged frequency signal; and
   determining an a-posteriori signal presence probability of a signal being present from an RF emitter in the region of interest based on the coarse estimate.

2. The autonomous RF spectral harvesting system of claim 1, wherein the processor is further configured to:
   perform a fine noise estimate of the spectral noise floor after the coarse estimate by applying a weighted average of the coarse noise estimate and the frequency signal,
   wherein the a-posteriori signal presence probability is based on the fine noise estimate.

3. The autonomous RF spectral harvesting system of claim 2, wherein the processor is further configured to:
   determine an a-posteriori signal to noise ratio (SNR) and an a-priori SNR based on the fine noise estimate,
   wherein the a-posteriori signal presence probability is based on the a-posteriori SNR and the a-priori SNR.

4. The autonomous RF spectral harvesting system of claim 3, wherein the a-priori SNR is determined further based on a spectral gain factor from a Weiner filter.

5. The autonomous RF spectral harvesting system of claim 1, wherein the processor is further configured to:
   determine an a-priori signal absence probability based on the coarse estimate; and
   temporally average the a-priori signal absence probability,
   wherein the a-posteriori signal presence probability is based on the temporally averaged a-priori signal absence probability.

6. The autonomous RF spectral harvesting system of claim 1, wherein the observed RF signals are converted into the frequency signal in a frequency domain based on a Weighted Overlap Add process.

7. The autonomous RF spectral harvesting system of claim 1, wherein the one or more sensor modules are mounted on aircraft.

8. The autonomous RF spectral harvesting system of claim 7, wherein the aircraft are unmanned.

9. The autonomous RF spectral harvesting system of claim 1,
   wherein the processor is further configured to:
   identify a RF emitter as a target based on the a-posteriori signal presence probability being above a confidence level.

10. The autonomous RF spectral harvesting system of claim 9,
    wherein the processor is further configured to:
    identify the type of an identified target based on the parameters of its frequency signal.

11. The autonomous RF spectral harvesting system of claim 10, wherein the parameters include at least one of a baud rate, Doppler frequency, or modulation family of the frequency signal of the identified target.

12. The autonomous RF spectral harvesting system of claim 10,
    wherein the processor is further configured to determine the target location of the identified target.

13. An autonomous radio frequency (RF) spectral harvesting method comprising:
    autonomously scanning RF signals, via one or more sensor modules, over a range of frequencies in a region of interest;
    receiving observed RF signals from the one or more sensor modules; and
    performing signal analysis on the observed RF signals received,
    the performing signal analysis comprising:
    converting the observed RF signals into a frequency signal in a frequency domain;
    temporally averaging the frequency signal to provide a temporally averaged frequency signal;
    performing a coarse estimate of a spectral noise floor of the observed RF signals based on the temporally averaged frequency signal using an opening technique that performs an erosion process followed by a dilation process on the temporally averaged frequency signal; and
    determining an a-posteriori signal presence probability of a signal being present from an RF emitter in the region of interest based on the coarse estimate.

14. The autonomous RF spectral harvesting method of claim 13, wherein the performing signal analysis further comprises:
    performing a fine noise estimate of the spectral noise floor after the coarse estimate by applying a weighted average of the coarse noise estimate and the frequency signal,
    wherein the a-posteriori signal presence probability is based on the fine noise estimate.

15. The autonomous RF spectral harvesting method of claim 14, wherein the performing signal analysis further comprises:
    determining an a-posteriori signal to noise ratio (SNR) and an a-priori SNR based on the fine noise estimate,
    wherein the a-posteriori signal presence probability is based on the a-posteriori SNR and the a-priori SNR.

16. The autonomous RF spectral harvesting method of claim 15, wherein the a-priori SNR is determined further based on a spectral gain factor from a Weiner filter.

17. The autonomous RF spectral harvesting method of claim 13, wherein the performing signal analysis further comprises
    determining an a-priori signal absence probability based on the coarse estimate; and temporally averaging the a-priori signal absence probability,
wherein the a-posteriori signal presence probability is based on the temporally averaged a-priori signal absence probability.

18. The autonomous RF spectral harvesting method of claim 13, wherein the observed RF signals are converted into the frequency signal in a frequency domain based on a Weighted Overlap Add process.

19. The autonomous RF spectral harvesting method of claim 13, further comprising:
identifying a RF emitter as a target based on the a-posteriori signal presence probability being above a confidence level.

20. The autonomous RF spectral harvesting method of claim 19, further comprising:
identifying the type of an identified target based on the parameters of its frequency signal.

* * * * *